(12) United States Patent
Hatran et al.

(10) Patent No.: US 11,825,785 B2
(45) Date of Patent: Nov. 28, 2023

(54) HIGH-DENSITY CULTIVATION SYSTEM, APPARATUS USED THEREIN, AND METHODS OF OPERATION THEREOF

(71) Applicant: Green Nimbus LLC, Henderson, CO (US)

(72) Inventors: Douglas P. Hatran, Milpitas, CA (US); Richard Le, Erie, CO (US); Xi Yang, Erie, CO (US)

(73) Assignee: Douglas P. Hatran, Milpitas, CA (US)

( * ) Notice: Subject to any disclaimer, the term of this patent is extended or adjusted under 35 U.S.C. 154(b) by 0 days.

(21) Appl. No.: 16/702,374

(22) Filed: Dec. 3, 2019

(65) Prior Publication Data

US 2021/0161090 A1 Jun. 3, 2021

(51) Int. Cl.
| | |
|---|---|
| *A01G 31/06* | (2006.01) |
| *A01G 9/24* | (2006.01) |
| *A01G 31/00* | (2018.01) |
| *A01G 9/14* | (2006.01) |
| *A01G 27/00* | (2006.01) |
| *A01G 9/02* | (2018.01) |

(Continued)

(52) U.S. Cl.
CPC ............ *A01G 31/06* (2013.01); *A01G 9/023* (2013.01); *A01G 9/249* (2019.05); *A01G 7/045* (2013.01); *A01G 9/143* (2013.01); *A01G 9/26* (2013.01); *A01G 27/005* (2013.01); *A01G 31/045* (2013.01); *A01G 2031/006* (2013.01)

(58) Field of Classification Search
CPC ...... A01G 31/06; A01G 31/045; A01G 9/023; A01G 9/143; A01G 9/26; A01G 7/045; A01G 27/005; A01G 2031/006
See application file for complete search history.

(56) References Cited

U.S. PATENT DOCUMENTS 5,325,627 A * 7/1994 Anderson .......... A01G 13/0281
47/84
7,055,282 B2 6/2006 Bryan, III
(Continued)

FOREIGN PATENT DOCUMENTS

DE 202019104692 U1 * 10/2019
EP 2885963 6/2015
(Continued)

*Primary Examiner* — Brady W Frazier
*Assistant Examiner* — Alanna K Peterson
(74) *Attorney, Agent, or Firm* — Levine Bagade Han LLP

(57) ABSTRACT

Disclosed are high-density soil-less hydroponic cultivation systems, apparatus used therein, and methods of operation thereof. A high-density soil-less cultivation system can comprise one or more grow columns, each comprising a column lumen, and one or more angled housings coupled to the grow columns. The system can further comprise a nutrient reservoir configured to contain a nutrient solution to be delivered to the grow columns, a capture conduit coupled to the grow columns configured to capture or recapture nutrient solution flowing through the grow columns, and a capture reservoir configured to collect the captured or recaptured nutrient solution from the capture conduit for delivery to the nutrient reservoir to be reused. The system can also comprise an omnidirectional light tower configured to shine light on the one or more angled housings to induce growth of any plant matter within the angled housings.

9 Claims, 8 Drawing Sheets

(51) Int. Cl.
  *A01G 31/04*    (2006.01)
  *A01G 7/04*    (2006.01)
  *A01G 9/26*    (2006.01)

(56) References Cited

U.S. PATENT DOCUMENTS

| | | | | |
|---|---|---|---|---|
| 8,250,809 | B2 * | 8/2012 | Simmons | A01G 31/02 |
| | | | | 47/62 N |
| 9,532,518 | B2 | 1/2017 | Kotsatos | |
| 9,591,814 | B2 * | 3/2017 | Collins | A01G 31/02 |
| 9,982,823 | B1 * | 5/2018 | Cornwall | G01M 3/2815 |
| 10,206,344 | B2 * | 2/2019 | Bryan, III | A01G 9/023 |
| D896,690 | S * | 9/2020 | Adolf | A01G 7/045 |
| 11,166,420 | B1 * | 11/2021 | Diehl | A01G 31/06 |
| 2014/0259920 | A1 * | 9/2014 | Wilson | A01G 22/00 |
| | | | | 47/62 R |
| 2015/0027356 | A1 * | 1/2015 | Fok | A01C 14/00 |
| | | | | 111/100 |
| 2017/0055470 | A1 * | 3/2017 | Polivka | A01G 24/30 |
| 2017/0188531 | A1 * | 7/2017 | Daniels | A01G 7/045 |
| 2018/0220595 | A1 * | 8/2018 | Hancock | A01G 9/023 |
| 2019/0124862 | A1 * | 5/2019 | Mays | A01G 9/26 |
| 2019/0327921 | A1 * | 10/2019 | Nelson | A01G 9/26 |
| 2020/0154658 | A1 * | 5/2020 | Narayanaswamy | A01G 9/02 |

FOREIGN PATENT DOCUMENTS

| | | | | |
|---|---|---|---|---|
| WO | WO 2011/051619 | | 5/2011 | |
| WO | WO-2013072990 | A1 * | 5/2013 | A01G 31/02 |
| WO | WO 2015/123725 | | 8/2015 | |
| WO | WO 2016/081711 | | 5/2016 | |
| WO | WO 2016/196733 | | 12/2016 | |

* cited by examiner

HIGH-DENSITY CULTIVATION SYSTEM, APPARATUS USED THEREIN, AND METHODS OF OPERATION THEREOF

FIELD OF TECHNOLOGY

The present disclosure relates generally to the field of high-density plant cultivation, and, more specifically, to an improved high-density soil-less hydroponic cultivation system, apparatus used therein, and methods of operation thereof.

BACKGROUND

High-density plant cultivation usually refers to the cultivation of plants in a small indoor environment, often in the absence of soil. Plants in such an environment are often grown vertically using hydroponics and artificial grow lights. Indoor vertical cultivation offers advantages to conventional outdoor soil-based cultivation since growers are free from having to deal with insects, invasive weeds, or soil-borne pests, thereby reducing the need for harmful insecticides or herbicides.

However, most traditional high-density plant cultivation systems are often beset with a litany of problems including root rot, the spread of bacteria through contaminated water, plants suffering from heat stress, and high water and electricity bills. The latter problem is often the result of cultivation systems that waste water or are not efficient in their water usage. In addition, while artificial lights such as high-pressure sodium lamps or metal halide lamps can mimic natural outdoor sunlight, such lights can also raise the temperature of an indoor grow environment above ideal temperature ranges and cause heat damage to young plants. Traditional high-density cultivation systems are often set up such that certain plants within the grow environment are exposed to too much light while other plants are exposed to too little light. Furthermore, most traditional hydroponic systems are designed such that components of the system cannot be cleaned or disassembled for cleaning unless all plant matter is removed from the system. This can make it difficult to maintain the system on a regular basis without disturbing the grow environment.

Therefore, a solution is needed which addresses the above shortcomings and disadvantages. Such a solution should optimize water and energy usage, control the amount of heat generated by artificial lights, and reduce any disparities in light exposure. In addition, such a system should be easy to disassemble for cleaning and maintenance and easy to re-assemble when done. Such a system, including components used therein, should be cost-effective to manufacture and not overly complicated to operate.

SUMMARY

Disclosed are high-density soil-less hydroponic cultivation systems, apparatus, and devices used by such systems, and methods of cultivating plants in a high-density environment without soil. In some embodiments, the high-density soil-less hydroponic cultivation system disclosed herein can be used to cultivate plants of the genus *Cannabis* including *Cannabis sativa* plants, *Cannabis indica* plants, or hybrids thereof. In other embodiments, the high-density soil-less hydroponic cultivation system disclosed herein can also be used to cultivate, inter alia, beets, tomatoes, eggplants, lettuce, kale, basil and other herbs, strawberries, blueberries, cucumbers, pumpkins, or watermelons.

In one embodiment, the high-density cultivations system comprises one or more grow columns, each having a column lumen, and one or more angled housings coupled to the grow columns. The grow columns can each be made in part of a plurality of detachable column segments connected by column couplers. At least one angled housing can be coupled to one of the plurality of detachable column segments.

Each of the angled housings can comprise a housing lumen in fluid communication with the column lumen. Each of the angled housings can be configured to accommodate at least one plant or plantlet. In some embodiments, the housing lumen can allow the roots of the plant to grow deeper into the housing lumen. In other embodiments, the housing lumen and the column lumen can both allow the roots of the plant to grow deeper into such lumens.

At least one of the angled housings can comprise a basket having one or more perforations along at least one of a bottom and side of the basket. The basket can be positioned within at least part of the housing lumen. The basket can be configured to hold the plant matter and accommodate root growth further into the housing lumen.

One or more angled housings can also comprise a light-blocking collar configured to block or obstruct light from entering the housing lumen. The light-blocking collar can have a port configured to allow at least part of the plant to extend through the port. In some embodiments, the light-blocking collar can be made in part of a water-resistant synthetic rubber such as polychloroprene (e.g., Neoprene®) or an elastomeric polymer such as ethylene-vinyl acetate. In other embodiments, at least one angled housing can comprise a porous reticulated foam support. The porous reticulated foam support can occupy at least part of the housing lumen and can be defined by a cavity or channel configured to accommodate plant matter.

The system can also comprise a nutrient reservoir configured to contain a nutrient solution to be delivered to the grow columns. The nutrient reservoir can be in fluid communication with or fluidly coupled to the grow columns via one or more fluid delivery pipes or conduits.

At least a segment of a fluid delivery pipe can be positioned above a column lumen of a grow column. The system can further comprise a spray sprinkler coupled to the segment of the fluid delivery pipe positioned above the column lumen. The spray sprinkler can be configured to spray the nutrient solution flowing through the fluid delivery pipe into the column lumen.

In some embodiments, the spray sprinkler can spray the nutrient solution into the column lumen periodically, intermittently, or a combination thereof. The spray sprinkler can spray the nutrient solution into the column lumen at intervals or periodically such that spray periods are followed by dry periods where no nutrient solution is delivered into the column lumen. For example, the spray sprinkler can spray the nutrient solution into the column lumen between about 10 minutes to about 15 minutes every sixty minutes. In other embodiments, the spray sprinkler can spray the nutrient solution into the column lumen between about 30 seconds to about 45 seconds every 5 minutes.

The system can further comprise a liquid cooling unit, such as a water chiller, for cooling the nutrient solution between about 65 degrees to about 68 degrees Fahrenheit. The liquid cooling unit can be in fluid communication with the nutrient reservoir such that the nutrient solution is circulated through the liquid cooling unit to be cooled.

The system can further comprise one or more capture conduits or pipes coupled to the grow columns. The capture conduits can comprise capture lumens in fluid communication with the column lumens. The capture conduits can be configured to capture (and recapture) nutrient solution flowing through the grow columns. In one embodiment, the capture conduits can be positioned beneath the grow columns.

The system can also comprise a capture reservoir configured to collect the captured or recaptured nutrient solution from the capture conduits. The captured or recaptured nutrient solution can be collected to be delivered to the nutrient reservoir for reuse. The capture reservoir can comprise a reservoir inlet. The reservoir inlet can be covered by a submersible filter configured to capture and filter out particulates from the captured or recaptured nutrient solution collected by the capture conduits.

The system can further comprise an omnidirectional light tower configured to shine light on the one or more angled housings to induce plant growth within the angled housings. In some embodiments, the omnidirectional light tower can be surrounded (e.g., on four sides) or encircled by a plurality of grow columns. In these embodiments, the angled housings can extend toward the omnidirectional light tower such that foliage of plant matter contained within the angled housings are exposed to light emitted by the omnidirectional light tower.

The omnidirectional light tower can comprise a columnar housing extending vertically and at least two types of high-intensity discharge (HID) lamps positioned vertically in an alternating manner within the columnar housing. At least part of the columnar housing comprising the HID lamps can be transparent. In some embodiments, the two types of HID lamps can comprise high-pressure sodium (HPS) lamps and dual arc hybrid lamps. In these embodiments, the HPS lamps and the dual arc hybrid lamps can be positioned in an alternating manner vertically within the columnar housing.

In certain embodiments, the dual arc hybrid lamp can be a combination HPS and metal halide (MH) lamp. In other embodiments, the dual arc hybrid lamp can be a combination HPS and ceramic metal halide (CMH) lamp.

The omnidirectional light tower can also comprise an activated-carbon air filter serving as a base of the omnidirectional light tower. The activated-carbon air filter can comprise a filter housing surrounding a filter cavity comprising activated carbon. In some embodiments, the activated-carbon air filter can also have a cloth filter or mesh filter covering the filter housing.

The filter cavity can be in fluid communication with a housing space within the columnar housing. The HID lamps, including the HPS lamps and the dual arc hybrid lamps, can be housed within the housing space. The omnidirectional light tower can also comprise an inline duct fan positioned above the HID lamps. Moreover, the inline duct fan can be in fluid communication with the housing space.

The inline duct fan can be configured to cool the omnidirectional light tower and ventilate an indoor grow environment by drawing in air through the activated-carbon air filter into the filter cavity and up through the housing space to be expelled outside of the indoor grow environment.

A method of cultivating plants without soil is also disclosed. The method comprises providing one or more grow columns, each comprising a column lumen, and an omnidirectional light tower. The method can also comprise positioning the one or more grow columns and the one or more angled housings coupled to the grow columns such that the angled housings extend toward or face the omnidirectional light tower. Each of the angled housings can comprise a housing lumen in fluid communication with the column lumen. Each of the angled housings can be configured to accommodate plant matter. At least one of the column lumen and the housing lumen can be configured to accommodate root growth of the plant matter within the angled housing into such lumens.

The method can also comprise delivering a nutrient solution from a nutrient reservoir to the grow columns. The nutrient solution can be delivered to the grow columns via one or more fluid delivery pipes in fluid communication with the nutrient reservoir.

The method can also comprise cooling the nutrient solution to between about 65 degrees to about 68 degrees Fahrenheit by circulating the nutrient solution through a liquid cooling unit in fluid communication with the nutrient reservoir. The nutrient solution can be cooled or chilled prior to being delivered to the grow columns.

At least one segment of a fluid delivery pipe can be positioned above a column lumen of a grow column. The method can further comprise spraying the nutrient solution flowing through the fluid delivery pipe into the column lumen using a spray sprinkler coupled to the segment of the fluid delivery pipe positioned above the column lumen. In some embodiments, each column lumen can have at least one spray sprinkler positioned above the column lumen to spray nutrient solution into the column lumen.

The nutrient solution can be sprayed into each column lumen periodically such that spray periods are followed by dry periods where no nutrient solution is delivered into the column lumen.

In addition, the method can comprise capturing (and eventually, recapturing) nutrient solution flowing through the grow columns. The method can further comprise delivering the captured or recaptured nutrient solution to the nutrient reservoir for reuse as the nutrient solution. The method can also comprise filtering the captured or recaptured nutrient solution prior to delivering the captured or recaptured nutrient solution to the nutrient reservoir for reuse.

The method can further comprise surrounding the omnidirectional light tower on at least two sides with a plurality of grow columns. The angled housings of the grow columns can be positioned such that the angled housings extend toward or face the omnidirectional light tower and the leaves of plant matter within such angled housings are exposed to light emitted by the omnidirectional light tower.

The omnidirectional light tower can comprise a columnar housing extending vertically upward. The omnidirectional light tower can also comprise at least two types of high-intensity discharge (HID) lamps positioned vertically in an alternating manner within the columnar housing. Parts of the columnar housing comprising the HID lamps can be transparent. In some embodiments, the two types of HID lamps can comprise high-pressure sodium (HPS) lamps and dual arc hybrid lamps. In these embodiments, the HPS lamps and the dual arc hybrid lamps can be positioned in an alternating manner vertically within the columnar housing.

The omnidirectional light tower can be cooled by drawing in air through one or more filter surfaces of an activated-carbon air filter serving as a base of the omnidirectional light tower. The air can be drawn in by an inline duct fan positioned above the HID lamps. The activated-carbon air filter can comprise a filter cavity comprising activated carbon. The filter cavity can be in fluid communication with a housing space within the columnar housing. The HID lamps, including the high-pressure sodium lamps and the dual arc hybrid lamps, can be contained within the housing space. The inline duct fan can be in fluid communication with the housing space such that air drawn in through the activated-carbon air filter is drawn up through the housing space of the column housing and then expelled through air ducts. This can ventilate an indoor grow environment and remove heat generated by the HID lamps.

DETAILED DESCRIPTION

Figure 1:
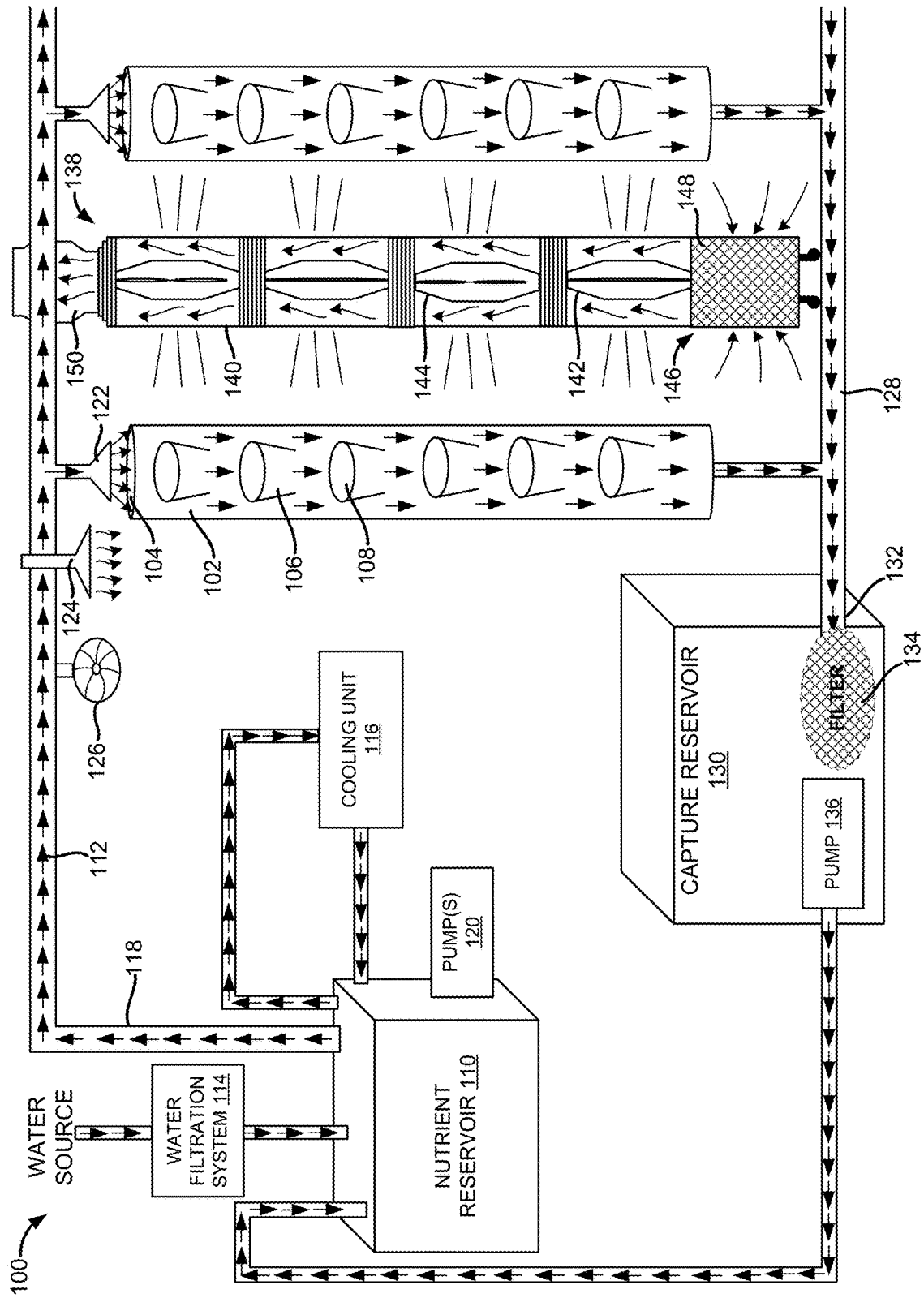
FIG. 1 illustrates an improved high-density plant cultivation system.

FIG. 1 is a schematic illustration of an improved high-density plant cultivation system 100. The system 100 can comprise a plurality of grow columns 102 with each grow column 102 having a column lumen 104. The grow columns 102 can be made in part of a polymeric material or another type of corrosion-resistant material. For example, the grow columns 102 can be made in part of polyvinyl chloride (PVC). In some embodiments, the grow columns 102 can be substantially cylindrical-shaped having a column diameter. For example, the grow columns 102 can be cylindrical columns having a column diameter of between about 3 inches (76 mm) to about 4 inches (102 mm). More specifically, the grow columns 102 can be 3-inch PVC pipes.

The system 100 can also comprise a plurality of angled housings 106 coupled to the grow columns 102 or extending from the grow columns 102. In some embodiments, the angled housings 106 can be angled pipe fittings attached to segments of piping configured to be connected to a grow column 102. In these embodiments, the angled housings 106 can be 3-inch PVC Wye fittings. In other embodiments, the angled housings 106 can be coupled to a grow column 102 by being inserted an angle into openings or perforations defined along a length of the grow column 102. In certain embodiments, the angled housings 106 can be positioned at an angle with respect to a longitudinal axis of the grow column 102. This angle can be about 45 degrees with respect to the longitudinal axis of the grow column 102. In other embodiments, the angle can be between about 25 degrees to about 45 degrees or between about 45 degrees and 60 degrees.

Each of the angled housings 106 can comprise a housing lumen 108 in fluid communication with the column lumen 104. The angled housings 106 can be configured to accommodate plant matter. For example, each of the angled housings 106 can be configured to accommodate a plantlet such as a young *Cannabis* clone. The housing lumen 108 can allow the roots of the plant or plantlet to grow further into the housing lumen 108. In addition, the housing lumen 108 can allow the roots of the plant or plantlet to grow through the entirety (i.e., through the entire length) of the housing lumen 108 and into the column lumen 104.

The system 100 can also comprise a nutrient reservoir 110. The nutrient reservoir 110 can be a container, tank, or basin for holding a nutrient solution 112 (the nutrient solution 112 is depicted in FIG. 1 using short straight-arrows. The direction of nutrient solution flow within the system 100 is also indicated using such arrows).

In some embodiments, the nutrient reservoir 110 can be a tank or container made in part of a non-corrosive or inert material. The nutrient reservoir 110 can have a nutrient reservoir volume. For example, the nutrient reservoir volume can be between about 30 gallons (114 L) to about 100 gallons (378 L). More specifically, the nutrient reservoir volume can be about 50 gallons (189 L).

The nutrient solution 112 can be an aqueous solution made in part of a diluted plant food concentrate or liquid fertilizer. In some embodiments, the nutrient solution 112 can comprise nitrogen (ammoniacal nitrogen and/or nitrate nitrogen), potassium (or soluble potash), calcium, magnesium, phosphates, molybdenum, or a combination thereof. The composition of the nutrient solution 112 within the nutrient reservoir 110 can be altered on a daily, weekly, or monthly basis.

Water used to make the nutrient solution 112 can be filtered or purified using a water filtration system 114. In some embodiments, the water filtration system 114 can be a reverse osmosis filtration system. For example, the water filtration system 114 can be a GrowoniX™ reverse osmosis filtration system capable of filtering between about 1500 gallons per day (GPD) to 2000 GPD of water from a water source, such as the tap.

The nutrient solution 112 within the nutrient reservoir 110 can have a pH of about 7. In certain circumstances, the pH of the nutrient solution 112 within the nutrient reservoir 110 can be between about pH 6.8 to about pH 7.2.

The system 100 can further comprise a liquid cooling unit 116, such as a water chiller, configured to cool the nutrient solution 112 within the nutrient reservoir 110 to be between about 65 degrees to about 68 degrees Fahrenheit. The liquid cooling unit 116 can be in fluid communication with the nutrient reservoir 110 such that the nutrient solution 112 is continuously circulated through the liquid cooling unit 116 to be cooled. In some embodiments, the liquid cooling unit 116 can be a freon-free water chiller capable of accommodating a flow rate of between about 400 gallons per hour (GPH) to about 4000 GPH.

As will be discussed in more detail in the following sections, the system 100 can capture or recapture nutrient solution 112 that has flowed through the grow columns 102. The captured or recaptured nutrient solution can be first collected in a capture reservoir 130 and then delivered back into the nutrient reservoir 110. The temperature of the recaptured nutrient solution can be higher than 68 degrees Fahrenheit as a result of the solution coming into contact with various pipes, plant roots, and pumps and the friction caused by such contact. Moreover, the captured or recaptured nutrient solution can also be warmed by the higher temperature within the indoor environment housing the grow columns 102. The liquid cooling unit 116 can be used to cool new instances of the nutrient solution 112 as well as captured or recaptured nutrient solution introduced into the nutrient reservoir 110 (when the captured or recaptured nutrient solution is introduced into the nutrient reservoir 110, the resulting solution can once again be referred to as the nutrient solution 112 for purposes of this disclosure). The liquid cooling unit 116 can be configured to ensure that the nutrient solution 112 delivered to the grow columns 102 (whether new instances of the nutrient solution 112 or the captured/recaptured nutrient solution) is cooled to between about 65 degrees to about 68 degrees Fahrenheit. The system 100 can comprise multiple liquid cooling units 116 including one or more backup liquid cooling units 116 in case the main liquid cooling unit 116 is non-functional or out of operation.

The nutrient solution 112 within the nutrient reservoir 110 can also be aerated or oxygenated by an aerator or oxygenation unit. The aerator or oxygenation unit can ensure that the nutrient solution 112 within the nutrient reservoir 110 is oxygenated prior to reaching the grow columns 102.

The nutrient reservoir 110 can be in fluid communication with or fluidly coupled to the grow columns 102 via one or more fluid delivery pipes 118 or conduits. The nutrient solution 112 within the nutrient reservoir 110 can be pumped to the grow columns 102 using one or more pumps 120 fluidly coupled to the nutrient reservoir 110. For example, the pumps 120 can be centrifugal pumps comprising impellers or impeller vanes. An inlet of the pump 120 can extend into the nutrient reservoir 110 and an outlet of the pump 120 can be fluidly coupled to the fluid delivery pipes 118.

The fluid delivery pipes 118 can allow the nutrient solution 112 to flow from the nutrient reservoir 110 into an indoor grow environment comprising the grow columns 102. For example, the indoor grow environment can be an enclosed indoor space, such as a room or part of a room. In some embodiments, the indoor grow environment can be a room separate from the room where the nutrient reservoir 110 is located. In other embodiments, the nutrient reservoir 110 can be located in the same room as the grow columns 102.

One or more segments of the fluid delivery pipes 118 can be positioned vertically above the column lumens 104 of the grow columns 102. In these embodiments, the column lumens 104 can be exposed or left open at a top end or superior end of the column lumens 104.

The system 100 can further comprise a plurality of spray sprinklers 122 coupled to the segments of the fluid delivery pipes 118 positioned above the column lumens 104. Each spray sprinkler 122 can be positioned vertically above a column lumen 104 of a grow column 102. In some embodiments, at least part of each spray sprinkler 122 can extend into part of the column lumen 104. In all such embodiments, the spray sprinklers 122 are positioned vertically above the highest angled housings 106 coupled to the grow columns 102.

The spray sprinklers 122 can be configured to spray the nutrient solution 112 flowing through the fluid delivery pipes 118 into the column lumens 104. In some embodiments, the spray sprinklers can be full pattern or full-circle (360 degrees) pattern sprinklers. More specifically, the spray sprinklers can be Orbit® full pattern shrub sprinklers.

The system 100 can be configured such that the spray sprinklers 122 spray or sprinkle the nutrient solution 112 into the column lumens 104 periodically. In other embodiments, the spray sprinklers 122 can be configured to spray or sprinkle the nutrient solution 112 into the column lumens 104 intermittently, or both periodically and intermittently. The spray sprinklers 122 can be controlled by a timer or timing mechanism.

The spray sprinklers 122 can spray the nutrient solution 112 into the column lumens 104 at intervals or periodically such that spray periods are followed by dry periods where no nutrient solution 112 is delivered into the column lumens 104. This can allow the roots of the plant matter housed within the angled housings 106 to dry up or begin to dry in between the spray periods. Doing so can improve the root health of such plants and improve water uptake.

For example, the spray sprinklers 122 can spray the nutrient solution 112 into the column lumens 104 between about 10 minutes to about 15 minutes every sixty minutes. In other embodiments, the spray sprinklers 122 can spray the nutrient solution 112 into the column lumens 104 between about 30 seconds to about 45 seconds every 5 minutes. The spray sprinklers 122 can also follow other periodic spraying schedules.

By spraying or sprinkling the nutrient solution 112 into the column lumens 104, the nutrient solution 112 can also be oxygenated or aerated prior to reaching the plant roots. Moreover, spraying or sprinkling the nutrient solution 112 into the column lumens 104 from above in this manner also ensures the nutrient solution 112 reaches all areas within each column lumen 104 and root growth is even and uniform within the column lumen 104.

One unexpected result discovered by the applicants is that spraying or sprinkling the nutrient solution 112 into the column lumens 104 of the grow columns 102 increased yields and generally improved plant health while significantly reducing water usage and waste.

The system 100 can also comprise a carbon dioxide generator 124. The carbon dioxide generator 124 can be positioned vertically above the grow columns 102. The system 100 can also comprise one or more fans 126 configured to circulate the carbon dioxide generated by the carbon dioxide generator 124 and blow the carbon dioxide down onto the plants within the angled housings 106.

The system 100 can further comprise one or more capture conduits 128 or capture pipes coupled to the grow columns 102. The capture conduits 128 can have capture lumens in fluid communication with the column lumens 104. The capture conduits 128 can be configured to capture (and eventually, recapture) nutrient solution 112 flowing through the column lumens 104. In some embodiments, the capture conduits 128 can be positioned vertically below the grow columns 102 and rely on gravity to direct the nutrient solution 112 to the capture conduits 128. In other embodiments, the capture conduits 128 can be coupled to segments of the grow column 102 along the length of the grow column 102 such that excess nutrient solution 112 or unused nutrient solution 112 flows out of the column lumens 104 into the capture conduits 128.

In some embodiments, the capture conduits 128 can be PVC pipes having a pipe diameter slightly larger than the diameter of the grow columns 102 (e.g., about 4 inches or 5 inches).

The system 100 can also comprise a capture reservoir 130 configured to collect the captured nutrient solution or recaptured nutrient solution (for purposes of this disclosure, the captured nutrient solution can refer to solution initially captured or collected and the recaptured nutrient solution can refer to solution that has been subsequently captured or collected). The capture conduits 128 can direct the captured or recaptured nutrient solution to a capture reservoir 130. The captured or recaptured nutrient solution can be collected to be delivered to the nutrient reservoir 110 for reuse (to be recirculated through the fluid delivery pipes 118, column lumens 104, and capture conduits 128).

The capture reservoir 130 can comprise at least one reservoir inlet 132. In some embodiments, the reservoir inlet 132 can be a distal segment of one of the capture conduits 128. In other embodiments, the reservoir inlet 132 can be an inlet affixed within the capture reservoir 130. The reservoir inlet 132 can be covered by a submersible filter 134. The submersible filter 134 can be submerged in the captured or recaptured nutrient solution within the capture reservoir 130.

The submersible filter 134 can be configured to capture and filter out particulates from the captured or recaptured nutrient solution. For example, the submersible filter 134 can capture and filter out plant debris, insects, or other waste products within the captured or recaptured nutrient solution. The submersible filter 134 can be cleaned or replaced on a periodic or regular basis to ensure the submersible filter 134 can continue to capture and filter out debris and other waste products. The submersible filter 134 will be discussed in more detail in the following section.

The capture reservoir 130 can also comprise or be coupled to one or more pumps 136. In some embodiments, the one or more pumps 136 can be submersible water pumps. In other embodiments, the one or more pumps 136 can be centrifugal water pumps or impeller-type pumps.

The pumps 136 can pump the captured or recaptured nutrient solution from the capture reservoir 130 to the nutrient reservoir 110 to be cooled by the cooling unit 116, aerated, and eventually recirculated back to the grow columns 102.

One unexpected result discovered by the applicants is that separating the capture reservoir 130 from the nutrient reservoir 110 (rather than combining the two reservoirs into one reservoir) improved the health of the plants within the indoor grow environment. For example, separating the capture reservoir 130 from the nutrient reservoir 110 can improve the quality and cleanliness of the recaptured nutrient solution. The capture reservoir 130 can also buffer the nutrient solution 112 within the nutrient reservoir 110 against drastic changes in temperature and can allow the nutrient solution 112 within the nutrient reservoir 110 more time to be cooled by the liquid cooling unit 116 before captured or recaptured nutrient solution is delivered to the nutrient reservoir 110 for reuse.

The system 100 can further comprise an omnidirectional light tower 138 configured to shine light on the plants or plantlets within the angled housings 106 coupled to the grow columns 102.

The omnidirectional light tower 138 can be surrounded (for example, on four sides) or encircled by a plurality of grow columns 102. Although two grow columns 102 are shown in FIG. 1, it is contemplated by this disclosure (and shown in FIGS. 3, 5, 6, and 7) that the system 100 can comprise a multitude of grow columns 102.

The angled housings 106 coupled to each of the grow columns 102 can be positioned such that the angled housings 106 extend toward or face the omnidirectional light tower 138. The angled housings 106 can extend toward the omnidirectional light tower 138 such that foliage of plants or plantlets contained within the angled housings 106 can be exposed to light emitted by the omnidirectional light tower 138.

The omnidirectional light tower 138 can comprise a columnar housing 140 (e.g., glass column or tube) extending vertically and at least two types of high-intensity discharge (HID) lamps positioned vertically in an alternating manner within the columnar housing 140. In some embodiments, the two types of HID lamps can comprise high-pressure sodium (HPS) lamps 142 and dual arc hybrid lamps 144. In these embodiments, the HPS lamps 142 and the dual arc hybrid lamps 144 can be positioned in an alternating manner vertically within the columnar housing 140. At least part of the columnar housing 140 comprising the HID lamps 142 can be transparent.

In certain embodiments, the dual arc hybrid lamp 144 can be a combination HPS and metal halide (MH) lamp. In other embodiments, the dual arc hybrid lamp 144 can be a combination HPS and ceramic metal halide (CMH) lamp.

The omnidirectional light tower 138 can also comprise an activated-carbon air filter 146 serving as a base of the omnidirectional light tower 138. The activated-carbon air filter 146 can comprise a filter housing 148 surrounding a filter cavity comprising activated carbon. In some embodiments, the activated-carbon air filter 146 can also have a cloth filter or mesh filter covering the filter housing 148.

The filter cavity can be in fluid communication with a housing space within the columnar housing 140. The HID lamps, including the HPS lamps 142 and the dual arc hybrid lamps 144, can be housed within the housing space.

The omnidirectional light tower 138 can also comprise an inline duct fan 150 positioned above the HID lamps. Moreover, the inline duct fan 150 can be in fluid communication with the housing space.

The inline duct fan 150 can be configured to cool the omnidirectional light tower 138 and, ultimately, cool the indoor grow environment. The inline duct fan 150 can also ventilate the indoor grow environment. The inline duct fan 150 can draw in air through the filter housing 148 of the activated-carbon air filter 146 into the filter cavity. The air drawn in can then be drawn up through the housing space of the columnar housing 140 into air ducts or vents to be expelled outside of the indoor grow environment. The omnidirectional light tower 138 will be discussed in more detail in the following sections.

Figure 2A:
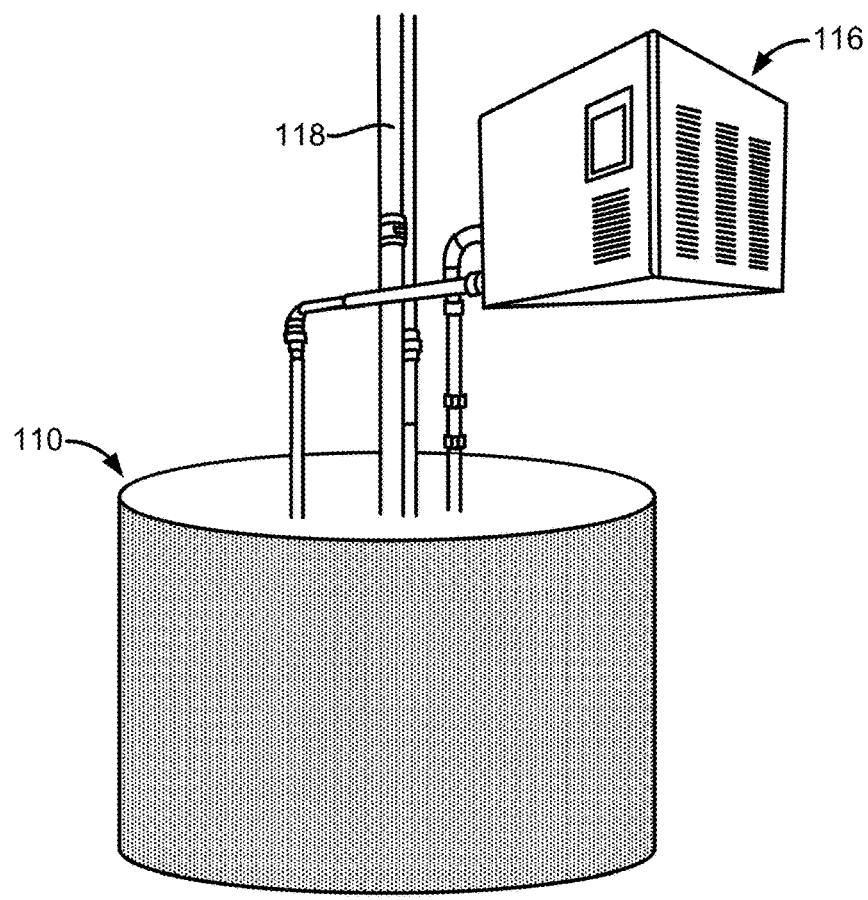
FIG. 2A illustrates embodiments of a nutrient reservoir and a liquid cooling unit of the system of FIG. 1.

FIG. 2A illustrates an embodiment of a nutrient reservoir 110 and a liquid cooling unit 116 fluidly coupled to the nutrient reservoir 110. As previously discussed, the nutrient reservoir 110 can be a container, tank, or basin for holding the nutrient solution 112. In some embodiments, the nutrient reservoir 110 can be a tank or container made in part of a non-corrosive or inert material such as a polymeric material. For example, the nutrient reservoir 110 can be a tank or container made in part of high-density polyethylene (HDPE), such as food-grade HDPE.

The nutrient reservoir 110 can have a nutrient reservoir volume. For example, the nutrient reservoir volume can be between about 30 gallons (114 L) to about 100 gallons (378 L). More specifically, the nutrient reservoir volume can be about 40 gallons (151 L) or about 50 gallons (189 L).

The nutrient solution 112 can be an aqueous solution. The nutrient solution 112 can provide all of the nutrients and growth regulators needed by the plants or plantlets housed within the angled housings 106. In some embodiments, the nutrient solution 112 can comprise nitrogen (ammoniacal nitrogen and/or nitrate nitrogen), potassium (or soluble potash), calcium, magnesium, phosphates, molybdenum, or a combination thereof. The composition of the nutrient solution 112 within the nutrient reservoir 110 can be altered on a daily, weekly, or monthly basis.

Water used to make the nutrient solution 112 can be filtered or purified using a reverse osmosis filtration or purification system prior to being added to the nutrient reservoir 110. The nutrient solution 112 can be made in part of tap water filtered using the reverse osmosis filtration or purification system.

The nutrient solution 112 within the nutrient reservoir 110 can have a pH of about 7. In certain circumstances, the pH of the nutrient solution 112 within the nutrient reservoir 110 can be between about pH 6.8 to about pH 7.2.

The system 100 can further comprise a liquid cooling unit 116, such as one or more water chillers (e.g., a primary water chiller and a backup water chiller). The liquid cooling unit 116 can be configured to cool the nutrient solution 112 within the nutrient reservoir 110 to between about 65 degrees to about 68 degrees Fahrenheit (about 18 degrees to about 20 degrees Celsius). The nutrient solution 112 can be pumped into the liquid cooling unit 116, cooled within the liquid cooling unit 116, and then pumped back into the nutrient reservoir 110. The nutrient solution 112, including the captured or recaptured nutrient solution from the capture reservoir 130, can be continuously circulated through the liquid cooling unit 116.

In some embodiments, the liquid cooling unit 116 can be a vapor compression refrigeration unit using a refrigerant such as a hydrofluorocarbon or hydrochlorofluorocarbon refrigerant. More specifically, the liquid cooling unit 116 can use an environmentally-safe refrigerant. In some embodiments, the liquid cooling unit 116 can be a water chiller comprising a titanium evaporator.

The liquid cooling unit 116 can be configured to ensure that the nutrient solution 112 delivered to the grow columns 102 (whether new instances of the nutrient solution 112 or the recaptured nutrient solution 112) is cooled to between about 65 degrees to about 68 degrees Fahrenheit (about 18 degrees to about 20 degrees Celsius). The system 100 can comprise multiple liquid cooling units 116 used to cool the nutrient solution 112.

The nutrient solution 112 within the nutrient reservoir 110 can also be aerated or oxygenated by an aerator or oxygenation unit. The aerator or oxygenation unit can ensure that the nutrient solution 112 within the nutrient reservoir 110 is oxygenated prior to reaching the grow columns 102.

Figure 2B:
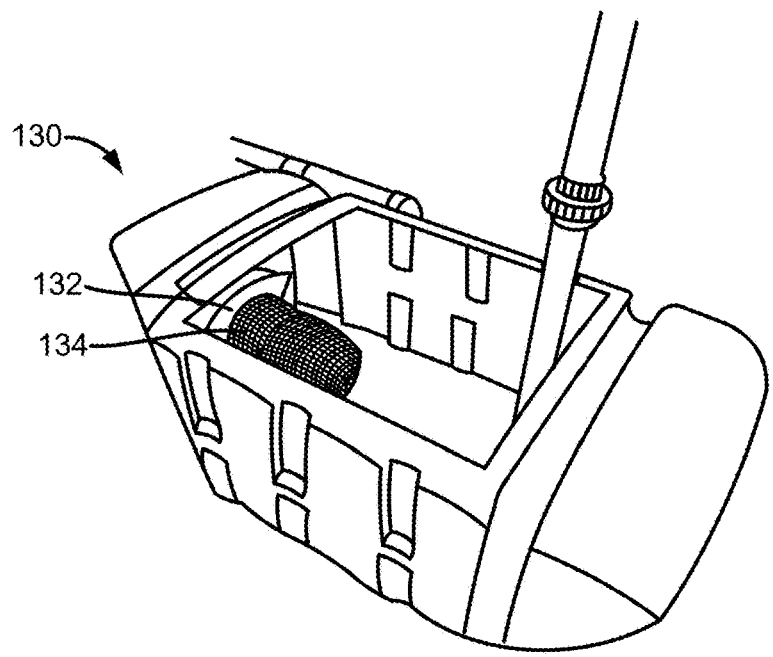
FIG. 2B illustrates embodiments of a capture reservoir comprising a submersible filter of the system of FIG. 1.

FIG. 2B illustrates an embodiment of a capture reservoir 130 comprising a submersible filter 134. The capture reservoir 130 can be a tank or container made in part of a non-corrosive or inert material. For example, the capture reservoir 130 can be a tank or container made in part of high-density polyethylene (HDPE), such as food-grade HDPE.

The capture reservoir 130 configured to collect the captured or recaptured nutrient solution. The capture reservoir 130 can be in fluid communication or fluidly coupled to one or more capture conduits 128. The capture conduits 128 can be pipes, tubes, or other types of conduits carrying the captured or recaptured nutrient solution to the capture reservoir 130.

The capture reservoir 130 can have a capture reservoir volume. For example, the capture reservoir volume can be between about 10 gallons (38 L) to about 50 gallons (189 L). More specifically, the capture reservoir volume can be about 15 gallons (57 L) or about 30 gallons (114 L).

In some embodiments, the capture reservoir volume can be less than the nutrient reservoir volume. One unexpected result discovered by the applicants is that a capture reservoir having a capture reservoir volume less than a nutrient reservoir volume improved the quality of the nutrient solution 112 eventually delivered to the grow columns 102. The difference in volumes between the two reservoirs ensures that, for the most part, a smaller amount of the captured or recaptured nutrient solution is introduced to a larger amount of the nutrient solution 112 within the nutrient reservoir 110 rather than a larger amount of the captured or recaptured nutrient solution added to a smaller amount of the nutrient solution 112 within the nutrient reservoir 110. This reduces the strain on the liquid cooling unit 116 and ensures that the nutrient solution 112 eventually delivered to the grow columns 102 is the correct temperature and sufficiently oxygenated or aerated.

The capture reservoir 130 can comprise at least one reservoir inlet 132. In some embodiments, the reservoir inlet 132 can be a distal segment of one of the capture conduits 128. In other embodiments, the reservoir inlet 132 can be an inlet affixed within the capture reservoir 130. The reservoir inlet 132 can be covered by a submersible filter 134. The submersible filter 134 can be submerged in the captured or recaptured nutrient solution within the capture reservoir 130.

The submersible filter 134 can be configured to capture and filter out particulates from the captured or recaptured nutrient solution. For example, the submersible filter 134 can capture and filter out plant debris, insects, or other waste products within the captured or recaptured nutrient solution. The submersible filter 134 can be cleaned or replaced on a periodic or regular basis to ensure the submersible filter 134 can continue to capture and filter out debris and other waste products.

The submersible filter 134 can be tied, clasped, or clamped around the reservoir inlet 132 such that fluid flowing through the reservoir inlet 132 passes through the submersible filter 134 before reaching the inside of the capture reservoir 130

In some embodiments, the submersible filter 134 can be a free-floating filter bag tied, clasped, or clamped around the reservoir inlet 132. For example, the submersible filter 134 can be made in part of nylon or be a nylon mesh bag having fine pores, holes or perforations. The submersible filter bag can be detached from the reservoir inlet 132 to be emptied and cleaned. One unexpected discovery made by the applicants is that a free-floating submersible filter such as a free-floating filter bag tied around the reservoir inlet improved the filtering capabilities of the capture reservoir 130.

In other embodiments, the submersible filter 134 can be a filter cage or box-type filter structure. In these embodiments, the entire filter cage or box-type filter structure can be detached from the reservoir inlet 132 and emptied or cleaned.

Although FIG. 2B illustrates one instance of the submersible filter 134, it is contemplated by this disclosure that a plurality of submersible filters 134 can be used to capture and filter out particulates from the captured or recaptured nutrient solution.

The capture reservoir 130 can also comprise or be coupled to one or more pumps 136 (not shown in FIG. 2B). In some embodiments, the one or more pumps 136 can be submersible water pumps. In other embodiments, the one or more pumps 136 can be centrifugal water pumps or impeller-type pumps. The one or more pumps 136 can pump the captured or recaptured nutrient solution from the capture reservoir 130 to the nutrient reservoir 110 to be cooled by the cooling unit 116, aerated, and eventually recirculated back to the grow columns 102.

The system 100 disclosed herein comprising the nutrient reservoir 110 and the capture reservoir 130 can reuse up to 95% to 98% of water flowing through the system 100. In this manner, water costs can be reduced up to 90% compared to traditional indoor hydroponic grow environments.

Figure 3:
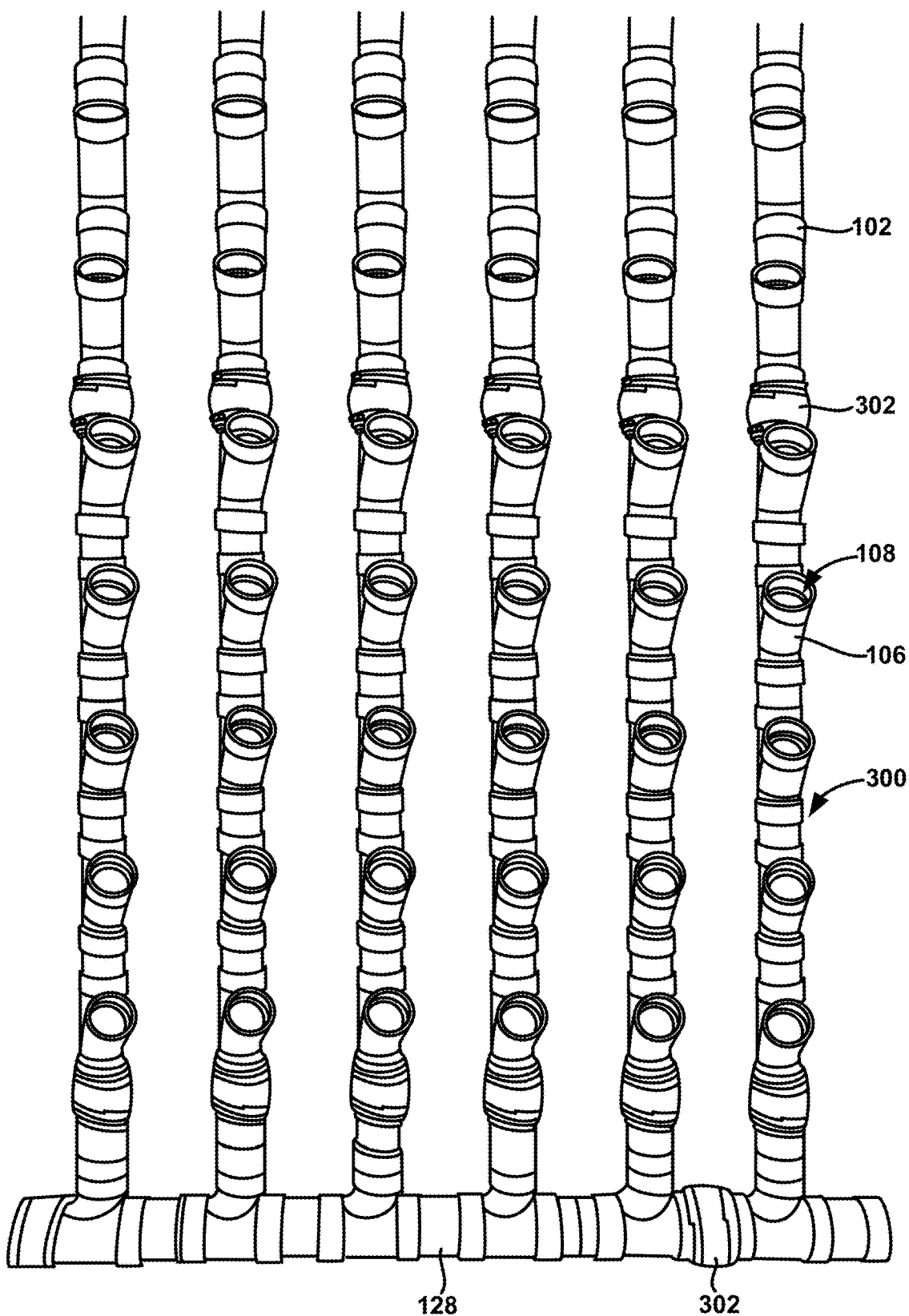
FIG. 3 illustrates a plurality of grow columns comprising angled housings.

FIG. 3 illustrates a plurality of grow columns 102 comprising angled housings 106. As previously discussed, the grow columns 102 can be made in part of a polymeric material or another type of corrosion-resistant material. For example, the grow columns 102 can be made in part of PVC pipes having a pipe diameter of between about 3 inches (76 mm) to about 4 inches (102 mm). In other embodiments, the pipe diameter can be 5 inches (127 mm) or greater. More specifically, the PVC pipes can be Schedule 40 PVC pipes. Alternatively, the PVC pipes can be Schedule 80 PVC pipes.

The grow columns 102 can each be made in part of a plurality of detachable column segments 300 connected by column couplers 302. At least one angled housing 106 can be coupled to each of the detachable column segments 300. In embodiments where the angled housings 106 are Wye fittings or Wye pipe fittings (for example, as shown in FIG. 3), some of the detachable column segment 300 can be coupled to two angled housings 106. In these embodiments, at least part of each angled housing 106 can serve as segments of the grow column 102.

In other embodiments not shown in the figures but contemplated by this disclosure, each of the detachable column segments 300 can be coupled to three or more angled housings 106 (for example, when the angled housings 106 are inserted into holes or openings defined along the column segment 300).

In some embodiments, the column couplers 302 can be expandable pipe joints. For example, the column couplers 302 can be made in part of elastomeric PVC. The column couplers 302 can be flexible and expandable such that the coupler accommodates any expansion or contraction of the detachable column segments 300. More specifically, the column couplers 302 can be Fernco® expandable joints or couplers.

The column couplers 302 can be secured to the detachable column segments 300 or a portion of the angled housings 106 using one or more hose clamps or other types of pipe clamps. For example, the hose clamps can be screw-tightened clamps made in part of stainless steel.

Each of the angled housings 106 can comprise a housing lumen 108 in fluid communication with a column lumen 104. The angled housings 106 can be configured to accommodate plant matter (see, e.g., FIG. 7). In some embodiments, each of the angled housings 106 can be configured to accommodate a plantlet such as a young *Cannabis* clone. The housing lumen 108 can allow the roots of the plant or plantlet to grow further into the housing lumen 108 and, eventually, into the column lumen 104. The roots of the plant can grow further into the column lumen 104 and become intertwined or entangled with roots of other plants in other angled housings 106 along the same grow column 102. This can allow the roots to form a root column 800 as shown in FIG. 8.

The grow columns 102 can be disassembled by separating the detachable column segments 300 from one another. Moreover, the grow columns 102 can also be disassembled by separating the angled housings 106 from one another or from the detachable column segments 300.

In some embodiments, the root column 800 can be extracted from the column lumen 104 when the grow column 102 is disassembled. In these embodiments, the system 100 and methods (e.g., method 900) disclosed herein can be considered systems and methods for cultivating a root column.

FIG. 3 also illustrates that the grow columns 102 can be coupled to one or more capture conduits 128. The capture conduits 128 can have capture lumens in fluid communication with the column lumens 104. The capture conduits 128 can be configured to capture (and eventually, recapture) nutrient solution 112 flowing through the column lumens 104. In some embodiments, the capture conduits 128 can be positioned vertically below the grow columns 102 and rely on gravity to direct the nutrient solution 112 to the capture conduits 128. In other embodiments, the capture conduits 128 can be coupled to segments of the grow column 102 along the length of the grow column 102 such that excess nutrient solution 112 or unused nutrient solution 112 flows out of the column lumens 104 into the capture conduits 128.

In some embodiments, the capture conduits 128 can be PVC pipes having a pipe diameter slightly larger than the diameter of the grow columns 102 (e.g., about 4 inches or 5 inches). In these and other embodiments, the capture conduits 128 can be made in part of multiple segments of PVC pipes coupled by couplers such as the column couplers 302 previously discussed.

The grow columns 102 and the capture conduits 128 can be disassembled in order to allow a user or grower to clean and maintain the grow columns 102 and the capture conduits 128. One advantage of the system 100 disclosed herein is that one or more grow columns 102 or portions of such grow columns 102 can be disassembled for cleaning or maintenance without affecting the other grow columns 102 or the remainder of the system 100. This can also allow a user or grower to easily swap out one or more grow columns 102 or replace segments of grow columns 102 when issues are discovered with the plants or plantlets cultivated in such grow columns 102.

In some embodiments, the grow columns 102 can be attached or otherwise secured or affixed to a wall of an indoor grow environment. For example, the grow columns 102 can be coupled to pipes, structures, columns, or supports along one or more walls of the indoor grow environment. The grow columns 102 can be coupled via braces, bands, or other types of mechanical fasteners or securement mechanisms.

For example, the grow columns 102 can cover four walls of a room or indoor grow environment. More specifically, the grow columns 102 can cover rectangular walls of a room comprising four walls and corners. In these embodiments, the grow columns 102 can be arranged substantially in a cuboid formation (i.e., where a top down view of such a formation would look like a rectangle made up of a plurality of circles lined up next to one another).

In other embodiments, the grow columns 102 can be arranged substantially in a cylindrical formation or cover the walls of an indoor space shaped substantially as a cylinder (i.e., where a top down view of such a formation would look like a larger circle made up of a plurality of smaller circles serving as the circumference of the larger circle).

In alternative embodiments, the grow columns 102 can be arranged substantially in an ovoid or ellipsoid configuration. In further embodiments, the grow columns 102 can be curved to accommodate the curvature of walls of a dome-shaped indoor environment.

In other embodiments not shown in the figures but contemplated by this disclosure, the grow columns 102 can be free-standing columns coupled to positions along the ceiling and floor of an indoor space. In further embodiments contemplated by this disclosure, the grow columns 102 can be coupled to a moveable platform or frame.

In all such embodiments, the grow columns 102 can surround one or more omnidirectional light towers 138. The one or more omnidirectional light towers 138 can be positioned substantially in a center of the grow columns 102 or substantially equidistant from the grow columns 102.

Where the grow columns 102 are free-standing or not attached or secured to walls of an indoor grow environment, the free-standing grow columns 102 can surround one or more omnidirectional light towers 138. When the grow columns 102 are coupled or otherwise secured to a moveable platform, the one or more omnidirectional light towers 138 can also be coupled or secured to the moveable platform.

Figure 4A:
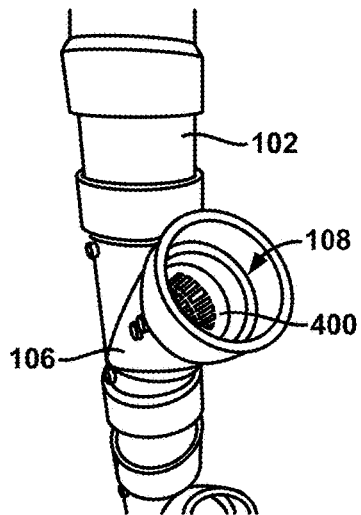
FIG. 4A illustrates a close-up view of an angled housing.

FIG. 4A illustrates a close-up view of an angled housing 106 comprising a basket 400 or planter basket positioned within the housing lumen 108 of the angled housing 106. In certain embodiments, the angled housings 106 can be positioned at an angle with respect to a longitudinal axis of the grow column 102. This angle can be about 45 degrees with respect to the longitudinal axis of the grow column 102. In other embodiments, the angle can be between about 25 degrees to about 45 degrees (e.g., about 30 degrees). In further embodiments, the angle can be between about 45 degrees and 60 degrees.

As previously discussed, the angled housings 106 can be 3-inch PVC Wye fittings coupled to 3-inch Schedule 40 PVC pipes serving as segments of a grow column 102. In other embodiments not shown in the figures but contemplated by this disclosure, the angled housings 106 can be pipes or other types of containers inserted into openings, cavities, or perforations defined along the sides of the grow columns 102. In these embodiments, the pipes or containers can be inserted at an angle relative to a longitudinal axis of the grow column 102.

Figure 4B:
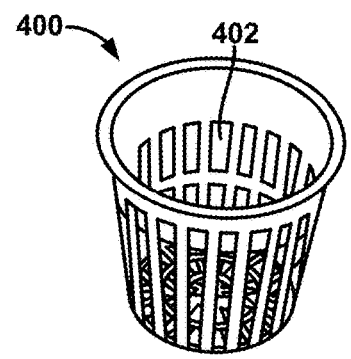
FIG. 4B illustrates a basket configured to be placed within the angled housing.

FIG. 4B illustrates an embodiment of a basket 400 or planter basket configured to be placed within the angled housing 106. In some embodiments, the basket 400 can be made of a polymeric material such as a corrosion-resistant plastic. For example, the basket 400 can be made in part of polypropylene. As a more specific example, the basket 400 can be a 3-inch or 2-inch net pot or planter cup.

The basket 400 can have a number of perforations 402 defined along the bottom, sides, or both the bottom and sides of the basket 400. The basket 400 can be configured to hold plant matter, growing medium, or a combination thereof. The perforations 402 along the bottom, sides, or bottom and sides of the basket 400 can allow the roots of the plant or plantlet to grow through the sides or bottom of the basket 400 and further into the housing lumen 108 or the column lumen 104.

In some embodiments, the basket 400 can be tapered or shaped substantially as a frustoconic having perforations 402 along the bottom and sides of the frustoconic. The basket 400 can fit into the housing lumen 108 via an interference fit. In certain embodiments, the basket 400 can have a flanged portion or rim around the top of the basket 400 that extend out radially such that the flanged portion or rim rests against ledges or indentations within the housing lumen 108.

The basket 400 can be partially filled with a growing medium. In some embodiments, the growing medium can comprise coco coir (or the fibrous material of the coconut), peat moss (sphagnum moss), coco coir peat, or a combination thereof.

Figure 4C:
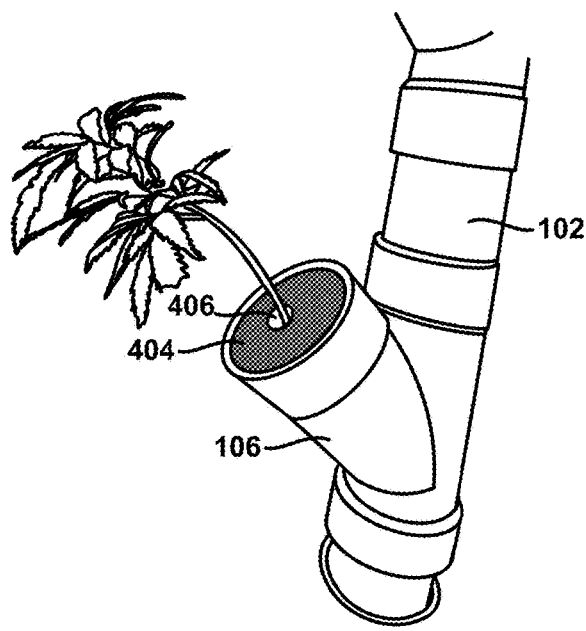
FIG. 4C illustrates an angled housing comprising a light-blocking collar and a plantlet extending through a port along the light-blocking collar.

FIG. 4C illustrates an angled housing 106 comprising a light-blocking collar 404 and a plantlet extending through a port 406 along the light-blocking collar 404. The light-blocking collar 404 can be configured to block or obstruct light from entering the housing lumen 108 when a plant or plantlet is planted or housed partly within the angled housing 106.

In some embodiments, plantlets or young plants measuring about eight inches or less can be introduced into the angled housings 106. For example, the plantlets can be *Cannabis* clones measuring about eight inches or less. In other embodiments, the plantlets or young plants can be introduced into the angled housings 106 when their roots are between three inches to four inches in length. In one example embodiment, a basket 400 can be first positioned within the housing lumen 108 and a growing medium can be introduced into the basket 400. The plant or plantlet can then be transplanted into the growing medium within the basket 400. The plant or plantlet can also be transplanted first into the basket 400 and additional growing medium can be added to the basket 400. The light-blocking collar 404 can then be positioned at the mouth or entrance of the angled housing 106 or close to the mouth or entrance of the angled housing 106.

The light-blocking collar 404 can have a port 406 or opening configured to allow at least part of the plant or plantlet to extend through the port 406. The light-blocking collar 404 can also have a slit or slot extending radially such that the light-blocking collar 404 can be opened or deformed to allow the collar to surround the stem or stalk of the plant or plantlet.

In some embodiments, the light-blocking collar 404 can be made in part of a water-resistant synthetic rubber such as polychloroprene (e.g., Neoprene®) or an elastomeric polymer such as ethylene-vinyl acetate. The light-blocking collar 404 can also be darkly-colored or opaque. For example, the light-blocking collar 404 can be a black-colored Neoprene® disk configured to fit tightly within at least part of the housing lumen 108.

The light-blocking collar 404 can be used to support or hold the stem or stalk of the plant. In certain embodiments, the light-blocking collar 404 can be used in lieu of the basket 400 (especially when the plants have surpassed a certain size threshold).

Figure 4D:
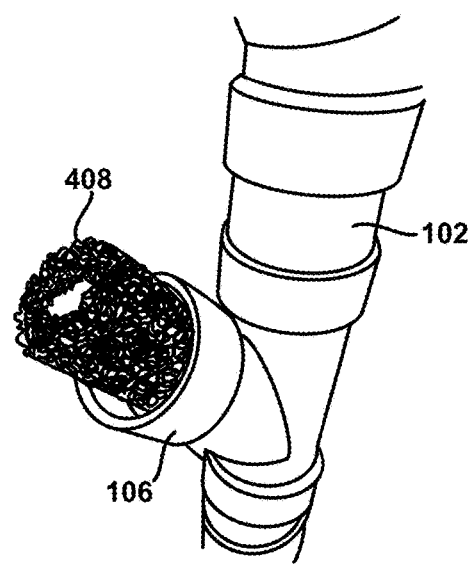
FIG. 4D illustrates an angled housing comprising a porous reticulated foam support for supporting plant matter.

FIG. 4D illustrates an angled housing 106 comprising a porous reticulated foam support 408 for supporting plant matter. In some embodiments, the reticulated foam support 408 can be used in lieu of the light-blocking collar 404, the basket 400, or a combination thereof.

The porous reticulated foam support 408 can occupy at least part of the housing lumen 108 and can be defined by a cavity or channel configured to accommodate plant matter. At least part of the porous reticulated foam support 408 can extend out past the angled housing 106.

The porous reticulated foam support 408 can have an open-cell structure comprising a multitude of pores. In some embodiments, the porous reticulated foam support 408 can have a pore density of between about 10 pores per inch (PPI) to about 35 PPI. The walls of the porous reticulated foam support 408 can be made of interconnected or interlocking struts or strands. The empty space in between such struts or strands can take up 95% to 98% of the overall volume occupied by the foam support 408.

In some embodiments, the porous reticulated foam support 408 can be made in part of polyurethane, polyether, polyesters or polyester glycol, or a combination thereof. In these and other embodiments, the porous reticulated foam support 408 can also be made of an organic material or organic fibers.

As shown in FIG. 4D, the porous reticulated foam support 408 can be shaped substantially as a porous tube having a hollow cavity extending through the length of the porous tube. The open-cell structure of the foam support 408 can allow the foam support 408 to act as a sponge to hold water or nutrient solution 112 while the struts or strands of the foam support 408 can block light and act as a filter or protective barrier against contaminants entering the angled housings 106.

Figure 5:
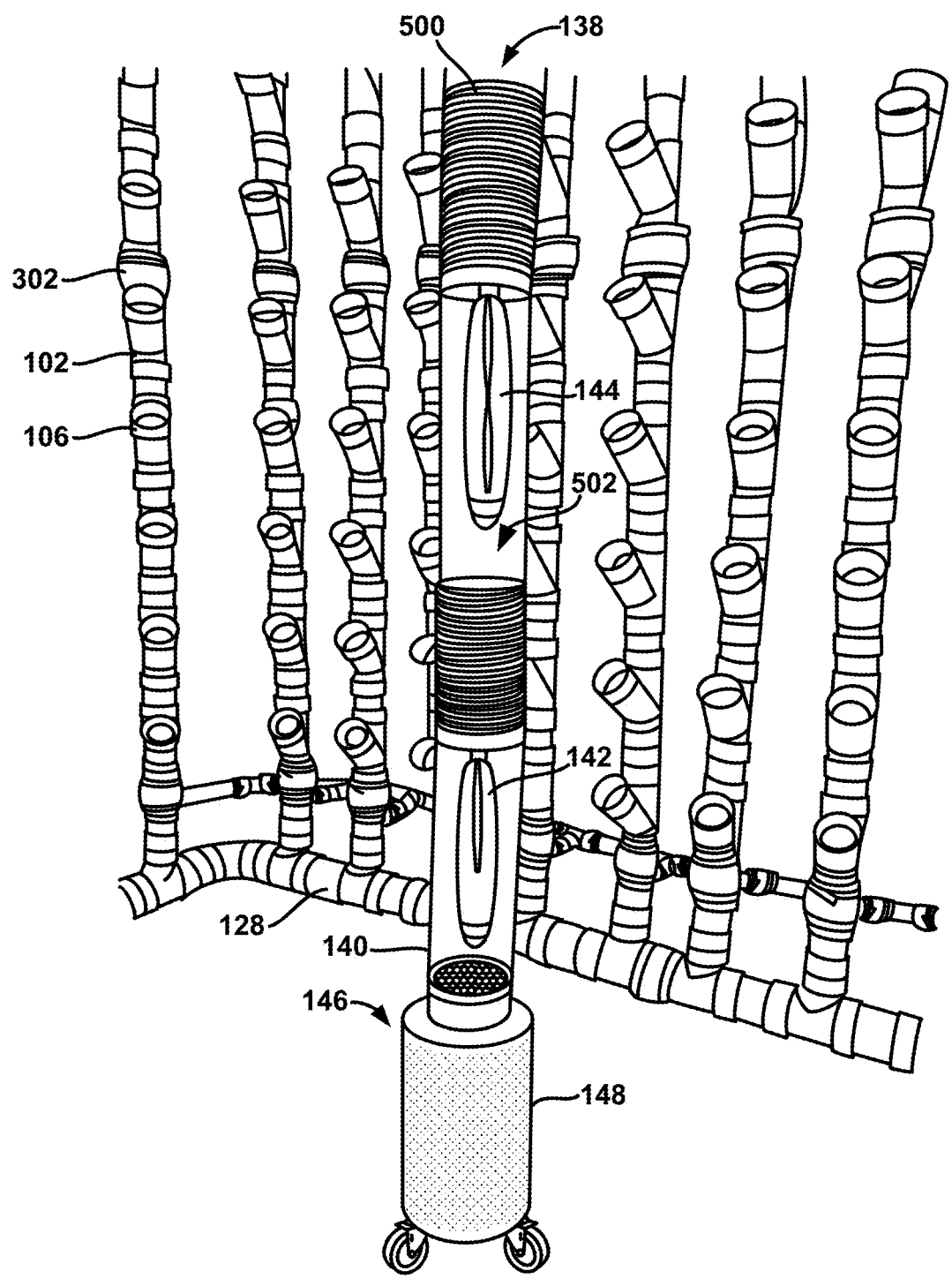
FIG. 5 illustrates a plurality of grow columns surrounding an embodiment of an omnidirectional light tower comprising an activated-carbon air filter serving as a base of the omnidirectional light tower.

FIG. 5 illustrates a plurality of grow columns 102 surrounding an embodiment of an omnidirectional light tower 138 comprising an activated-carbon air filter 146 serving as a base of the omnidirectional light tower 138. The omnidirectional light tower 138 can be configured to shine light on the foliage or other chlorophyll containing portions of the plants or plantlets extending from the angled housings 106. As previously discussed, the grow columns 102 and the angled housings 106 can be positioned such that the foliage or other chlorophyll containing portions of the plants or plantlets housed by the angled housings 106 extend or face the lamps of the omnidirectional light tower 138.

The omnidirectional light tower 138 can comprise a columnar housing 140 extending vertically upward toward a ceiling of the indoor grow environment. At least part of the columnar housing 140 can be made of a transparent glass-type material. For example, the transparent segments of the columnar housing 140 can be made in part of fused quartz or borosilicate glass (e.g., Pyrex® glass). In some embodiments, the transparent segments of the columnar housing 140 can be a quartz column substantially shaped as a cylinder or tube. The transparent segments of the columnar housing 140 can comprise a number of high-intensity discharge (HID) lamps arranged in a stacked or vertically-aligned manner.

The omnidirectional light tower 138 can comprise at least two types of HID lamps. In some embodiments, the two types of HID lamps can comprise high-pressure sodium (HPS) lamps 142 and dual arc hybrid lamps 144.

In certain embodiments, the dual arc hybrid lamp 144 can be a combination HPS and metal halide (MH) lamp. In other embodiments, the dual arc hybrid lamp 144 can be a combination HPS and ceramic metal halide (CMH) lamp.

In some embodiments, the omnidirectional light tower 138 can comprise seven HID lamps arranged in a stacked or vertically-aligned manner. For example, the omnidirectional light tower 138 can comprise four HPS lamps 142 and three dual arc hybrid lamps 144. In other example embodiments, the omnidirectional light tower 138 can comprise three HPS lamps 142 and four dual arc hybrid lamps 144.

In further embodiments not shown in the figures but contemplated by this disclosure, the omnidirectional light tower 138 can comprise between five and seven HID lamps or greater than seven HID lamps depending on the height of the indoor growing environment.

In some embodiments, the HPS lamps 142 can be 1000 watt (W) lamps capable of outputting between about 90,000 to about 140,000 lumens and have a temperature rating of between about 2000 degrees Kelvin to about 3800 degrees Kelvin. The HPS lamps 142 can emit light primarily having an orange or red hue or tint where the spectral range is focused between about 560 nanometers (nm) to about 700 nm. The use of HPS lamps 142 can benefit plants in their initial vegetative phase or stage.

In these and other embodiments, the dual arc hybrid lamps 144 can be hybrid lamps comprising a 400 W metal halide or ceramic metal halide arc tube and a 600 W high pressure sodium arc tube. The dual arc hybrid lamps 144 can be capable of outputting between about 110,000 to about 150,000 lumens and have a temperature rating of between about 3000 degrees Kelvin to about 4200 degrees Kelvin. The dual arc hybrid lamps 144 can emit light primarily having a blue or blue-green hue or tint where the spectral range is focused between about 400 nm to 540 nm. The use of dual arc hybrid lamps 144 can benefit plants in their later flowering and fruiting stages.

The two types of HID lamps can be arranged in an alternating stacked arrangement so that all plants or plantlets housed within angled housings 106 along the entire height of the grow columns 102 can be exposed to the light emitted by such lamps. In this manner, plants or plantlets at the very bottom (or very top) of the grow columns 102 are not positioned at a disadvantage from other plants or plantlets along the remainder of the grow columns 102. This sets the omnidirectional light tower 138 apart from traditional hydroponic lighting systems which are either hung from the ceilings so that such lights favor plants near the top of the growing environment or placed on the ground such that they favor plants near the bottom of the growing environment.

The transparent segments of the columnar housing 140 and the stacked or vertically-aligned arrangement of the lamps can allow the light tower 138 to emit light in all directions (i.e., in an omnidirectional manner). A technical advantage of this light design over other hydroponic lighting systems is that this light design reduces the need for cumbersome light reflectors or hoods and drastically reduces the number of high-powered lamps needed to support a high-density growing environment. For example, the applicants have discovered that a version of the omnidirectional light tower 138 disclosed herein comprising only seven HID lamps can support a total of 500 *Cannabis* clones throughout the plants' entire life cycle including from the initial vegetative stage to the later flowering stage.

Moreover, it has been discovered by the applicants that using both HPS lamps 142 and dual arc hybrid lamps 144 comprising both HPS arc tubes and metal halide arc tubes significantly accelerated the growth of plants and plantlets within the angled housings 106.

FIG. 5 also illustrates that the transparent segments of the columnar housing 140 (e.g., the quartz columns or tubes) containing the lamps of the omnidirectional light tower 138 can be connected to one another by one or more flexible ducts 500 or connectors. In some embodiments, the flexible ducts 500 or connectors can be aluminum foil ducts, semi-rigid metal ducts, or reinforced plastic ducts. The flexible ducts 500 and the transparent segments of the columnar housing 140 can form most of the columnar housing 140.

The columnar housing 140 can define a housing space 502 extending through the entirety of the interior of the columnar housing 140. The housing space 502 can include the interior or inner lumens of the quartz columns and the flexible ducts 500. The HID lamps, including the HPS lamps 142 and the dual arc hybrid lamps 144, can be housed within the housing space 502.

In addition, FIG. 5 illustrates that the omnidirectional light tower 138 can comprise an activated-carbon air filter 146 serving as a base of the omnidirectional light tower 138. The activated-carbon air filter 146 can comprise a filter housing 148 surrounding a filter cavity comprising activated carbon. In some embodiments, the activated-carbon air filter 146 can also have a cloth filter or mesh filter covering the outer filter surface of the filter housing 148.

The activated-carbon air filter 146 can be configured to filter air that is drawn into the filter cavity. The filter cavity can be in fluid communication with the housing space 502 within the columnar housing 140.

In some embodiments, the activated carbon within the filter cavity can be made in part from coconut shells. The cloth filter or mesh can act as an extra filtering layer and can prevent the activated carbon from becoming contaminated or prevent the activated carbon from leaking out and going to waste. The cloth filter or mesh can be detached from the filter housing 148 for cleaning and maintenance. The cloth filter can also be replaced on a regular basis.

Figure 6:
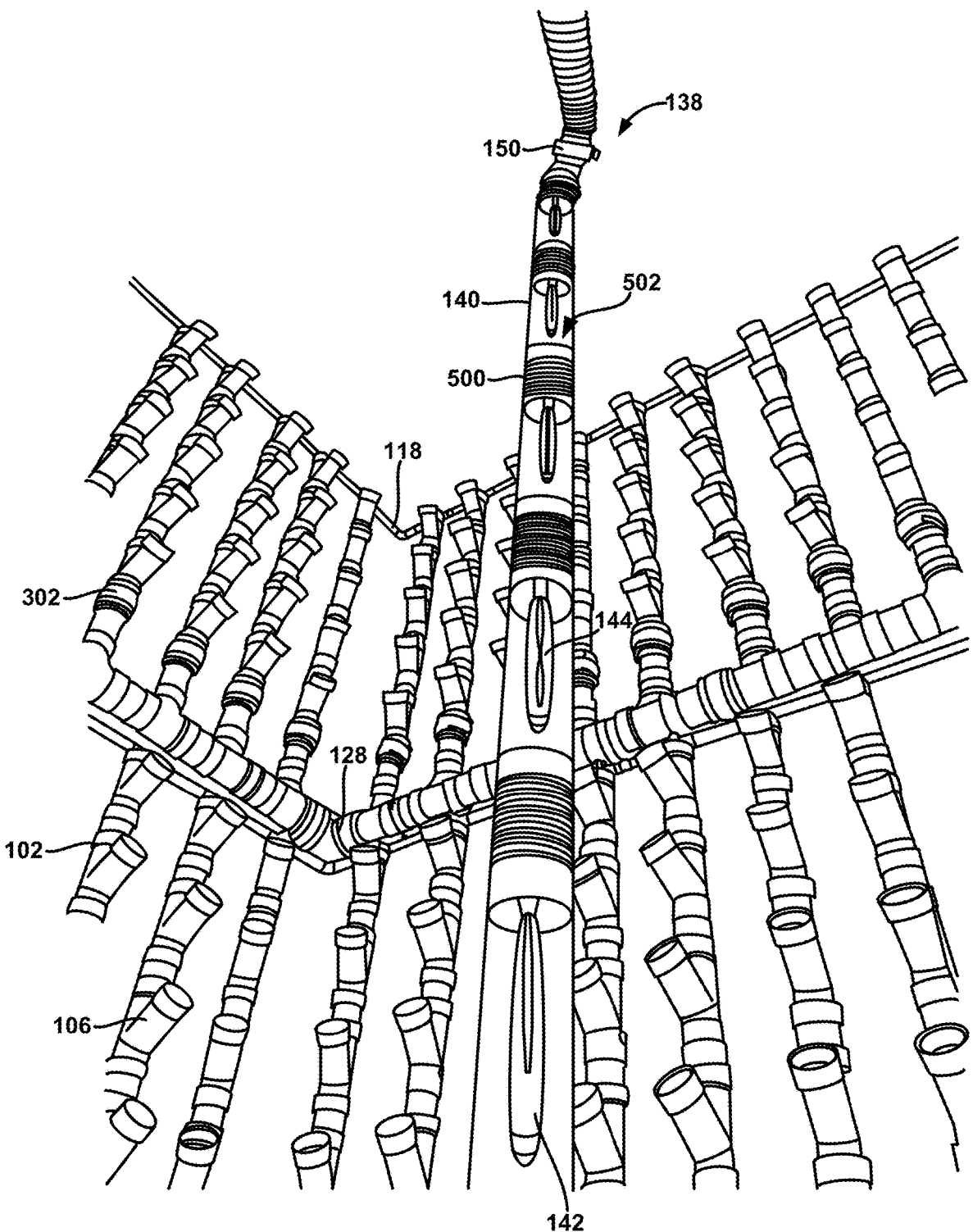
FIG. 6 illustrates the top of the omnidirectional light tower comprising an inline duct fan.

FIG. 6 illustrates the top of the omnidirectional light tower 138 comprising an inline duct fan 150 coupled to the top of the columnar housing 140. The inline duct fan 150 can be part of the omnidirectional light tower 138. The inline duct fan 150 can be positioned above the HID lamps.

In some embodiments, the inline duct fan 150 can be an inline duct fan capable of supporting airflow rates of between about 1480 cubic feet per minute (CFM) to about 1800 CFM. The inline duct fan 150 can be remotely controlled and can comprise a programmable controller.

The inline duct fan 150 can be configured to cool the omnidirectional light tower 138 and, ultimately, the indoor grow environment. In addition, the inline duct fan 150 can periodically or continuously draw in air from the indoor grow environment into the activated-carbon air filter 146 to filter or purify the air within the indoor grow environment.

The inline duct fan 150 can draw in air through the filter housing 148 of the activated-carbon air filter 146 at the bottom of the omnidirectional light tower 138. As previously discussed, the filter cavity can comprise activated carbon (e.g., activated carbon from coconut shell). The air can flow into the filter cavity, then be drawn up through the housing space 502, and then be expelled by the inline duct fan 150 into air ducts or vents leading to an environment outside the indoor grow environment. This can simultaneously remove heat generated by the various lamps within the columnar housing 140 (by expelling the heated air into an external environment outside the indoor grow environment) and ventilate the indoor grow environment.

In this manner, the omnidirectional light tower 138 can serve multiple purposes including providing light to plant matter within the high-density indoor grow environment, removing heat generated by the lights, and filtering or purifying the air within the indoor grow environment.

The system 100 can also comprise additional air cooling units or air conditioning units to supply filtered cool air into the indoor grow environment. The presence of an omnidirectional light tower 138 having its own heat removal mechanism reduces the reliance of the indoor grow environment on energy inefficient air conditioning units or cooling units. This greatly reduces energy costs and equipment maintenance costs.

As shown in FIGS. 5 and 6, the omnidirectional light tower 138 can be portable and moveable. For example, the activated-carbon air filter 146 serving as the base of the light tower 138 can have casters or wheels coupled to the bottom of the air filter 146.

Moreover, the omnidirectional light tower 138 can also be rotatable (rotate with respect to its longitudinal axis) or capable of being moved along a track or rails within the indoor grow environment.

One technical problem faced by the applicants is how to adequately supply light to all plants within a high-density indoor grow environment without inundating the indoor grow environment with too many heat-generating lamps. In addition, the heat generated by traditional grow lamps must often be countered with expensive and bulky air conditioning units that drive up energy costs and equipment maintenance costs. The technical solution discovered by the applicants is the omnidirectional light tower 138 disclosed herein comprising different types of lamps arranged in an alternating stacked arrangement comprising an air filter serving as a base of the light tower 138 and an inline fan at the top of the light tower 138 drawing in air through the air filter into the tower housing and out to an external environment away from the indoor grow environment.

Figure 7:
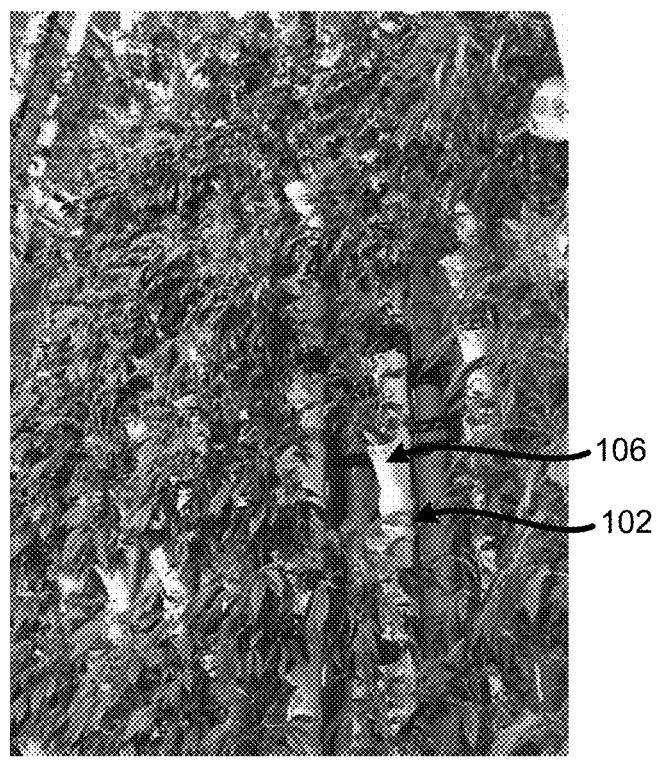
FIG. 7 is a black-and-white image of plants growing out of the angled housings of a plurality of grow columns.
Figure 8:
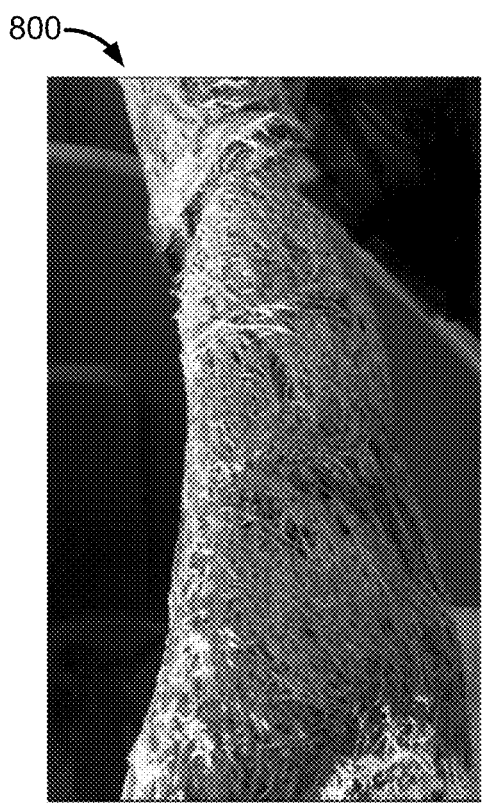
FIG. 8 is a black-and-white image of a root column extracted from a column lumen of a grow column.

FIG. 7 is a black-and-white image of plants growing out of the angled housings 106 of a plurality of grow columns 102. As shown in FIG. 7, the grow columns 102 can be affixed or otherwise secured to a wall of an indoor space such as a warehouse or room. In these embodiments, the grow columns 102 can cover all of the walls of the indoor space. In other embodiments not shown in the figures but contemplated by this disclosure, the grow columns 102 can be free-standing columns coupled to positions along the ceiling and floor of an indoor space. In further embodiments contemplated by this disclosure, the grow columns 102 can be coupled to a moveable platform or frame.

In certain embodiments, the system 100 can cultivate up to 500 plants within a 100 square feet (or about 9.29 square meters) indoor space or facility. The system 100 can use an omnidirectional light tower 138 comprising seven HID lamps (a combination of HPS lamps 142 and hybrid lamps 144) to cultivate the 500 plants. In other embodiments, the indoor space or facility can be more than 100 square feet (e.g., 400 square feet) and the indoor space or facility can be divided into four 100 square feet spaces with each 100 square feet space having an omnidirectional light tower 138 in the middle surrounded by grow columns 102 on all sides. In these embodiments, the system 100 can cultivate up to 2000 plants within the 400 square feet space using four omnidirectional light towers 138.

In other embodiments, the system 100 can cultivate up to 1000 plants within a 100 square feet space or facility by positioning the grow columns 102 closer to one another.

FIG. 8 is a black-and-white image of a root column 800 extracted from a column lumen 104 of a grow column 102. The root column 800 can be harvested by separating the plurality of detachable column segments 300 and removing the intact root column 800 from the column lumen 104. The root column 800 can be formed from the roots of *Cannabis* plants grown within the angled housings 106 of one of the grow columns 102 disclosed herein.

As previously discussed, the housing lumens 108 of the angled housings 106 can allow the roots of plants or plantlets (e.g., *Cannabis* clones) to grow through the housing lumens 108 and into the column lumen 104 in fluid communication with the housing lumens 108. Once the roots of the plants or plantlets grow into the column lumen 104, the roots become intertwined or entangled with roots of other plants in other angled housings 106 along the same grow column 102.

Over time, the roots become more intertwined and entangled and form into a root column 800. Once the plants within the angled housings 106 are harvested, the root column 800 can also be harvested by disassembling the detachable column segments 300 making up the grow column 102. In this manner, the system 100 and methods (e.g., method 900) disclosed herein can also be considered systems and methods for cultivating a root column, for example, a *Cannabis* root column.

Once harvested, the root column 800 can be used to make medicinal teas, salves, and medicinal preparations. For example, the root column 800 can be dried and ground up into a powder for making salves or topicals. The root column 800 can also be cut up and boiled to make certain medicinal teas or brewed drinks. The root column 800 can be cut up to be used as a growing medium for future plants or for composting purposes. Moreover, the root column 800 can also be ground up and used as mulch or to replenish soil.

One unexpected result discovered by the applicants is that the system and methods disclosed herein can also be used to cultivate high-quality root columns that can be sold for their medicinal properties. Such robust and compact root columns are not formed in traditional hydroponic systems relying on horizontal watering troughs or conduits.

Figure 9:
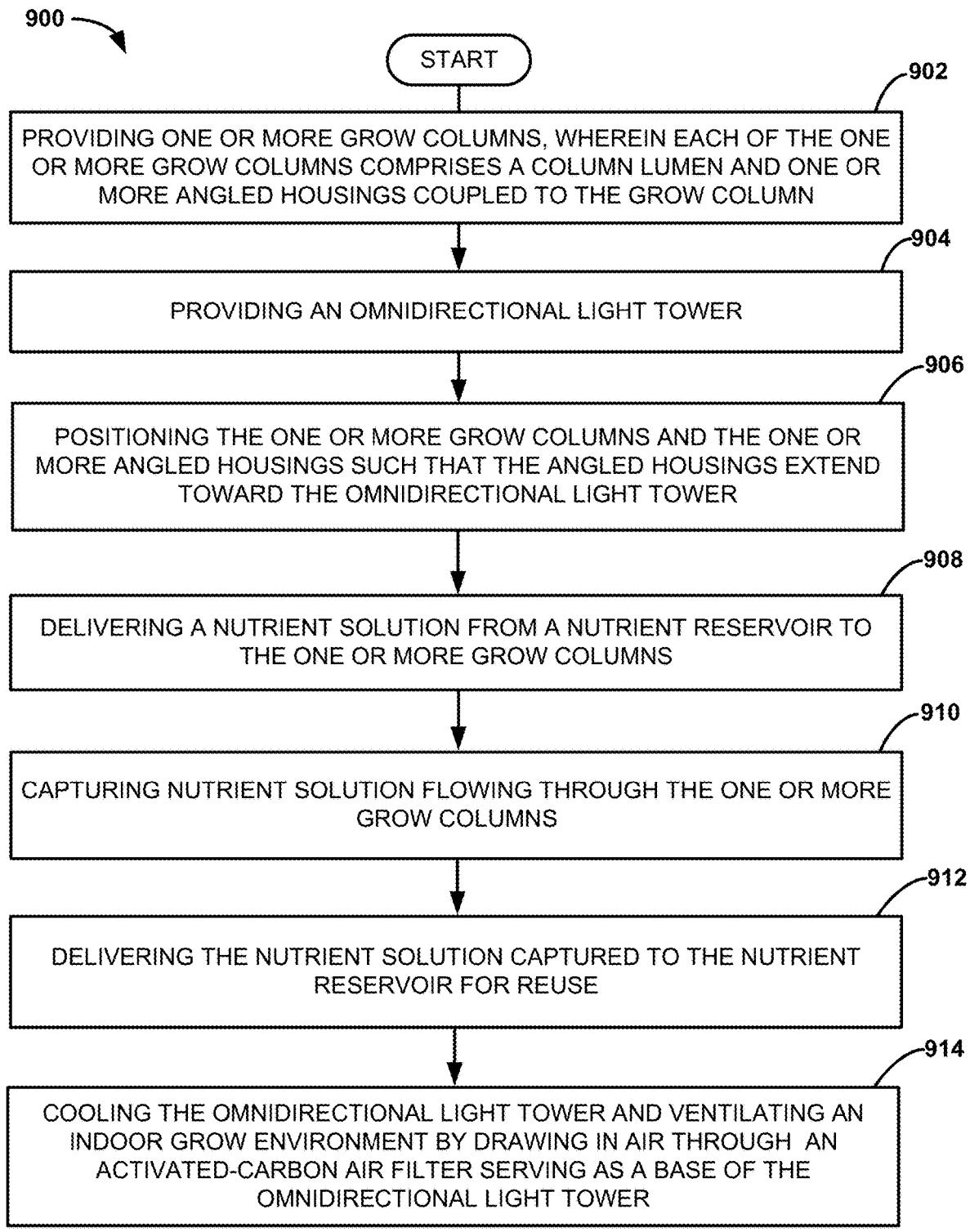
FIG. 9 is an embodiment of a method of cultivating plants or plant matter without soil.

FIG. 9 is an embodiment of a method 900 of cultivating plants without soil. The method 900 can be undertaken using the entire system 100 disclosed herein or parts thereof.

In some embodiments, certain steps of the method 900 can also be used to cultivate *Cannabis* clones. In other embodiments, certain steps of the method 900 can also be used to cultivate, inter alia, beets, tomatoes, eggplants, lettuce, kale, basil and other herbs, strawberries, blueberries, cucumbers, pumpkins, or watermelons.

The method 900 can comprise providing one or more grow columns 102 in step 902. Each of the one or more grow columns 102 can comprise a column lumen 104 and one or more angled housings 106 coupled to the grow column 102.

The method 900 can also comprise providing an omnidirectional light tower 138 in step 904. The omnidirectional light tower 138 can comprise a columnar housing 140, one or more high-pressure sodium lamps 142 positioned within transparent segments of the columnar housing 140 and at least one dual arc hybrid lamp 144 positioned above or below the one or more high-pressure sodium lamps 142 within the columnar housing 140.

The method 900 can further comprise positioning the one or more grow columns 102 and the one or more angled housings 106 such that the angled housings 106 extend toward the omnidirectional light tower 138 in step 906. Each of the angled housings 106 can comprise a housing lumen 108 in fluid communication with the column lumen 104. Each of the angled housings 106 can be configured to accommodate plant matter. The housing lumen 108, the column lumen 104, or a combination thereof can be configured to accommodate root growth of the plant matter into such lumens.

The method 900 can also comprise delivering a nutrient solution from a nutrient reservoir 110 to the one or more grow columns 102 in step 908. The nutrient solution can be delivered via one or more fluid delivery pipes 118 in fluid communication with the nutrient reservoir 110. In some embodiments, one or more segments of the fluid delivery pipes 118 can be positioned above the column lumens 104 of the grow columns 102. Step 908 can further comprise spraying the nutrient solution flowing through the fluid delivery pipes 118 into the column lumens 104 using spray sprinklers 122 coupled to the fluid delivery pipes 118 positioned above the column lumens 104. The nutrient solution can be sprayed into the column lumens 104 periodically such that spray periods are followed by dry periods where no nutrient solution is delivered into the column lumens 104.

The method 900 can also comprise capturing (and recapturing) nutrient solution flowing through the one or more grow columns 102 in step 910. The nutrient solution can be captured (and recaptured) using one or more capture conduits 128. The capture conduits 128 can direct or otherwise carry the captured (or recaptured) nutrient solution flowing through the column lumens 104 to a capture reservoir 130. The captured or recaptured nutrient solution can be filtered by one or more submersible filters 134 within the capture reservoir 130.

The method 900 can further comprise delivering the nutrient solution captured or recaptured to the nutrient reservoir 110 to be recirculated and reused in step 912. The nutrient solution can be pumped from the capture reservoir 130 to the nutrient reservoir 110. The nutrient solution can be cooled or chilled to between about 65 degrees to about 68 degrees Fahrenheit using a liquid cooling unit 116. The nutrient solution can be cooled by being circulated through the liquid cooling unit 116. The nutrient solution can be cooled or chilled prior to being delivered or recirculated to the one or more grow columns 102.

The method 900 can also comprise cooling the omnidirectional light tower 138 by drawing in air through an activated-carbon air filter 146 serving as a base of the omnidirectional light tower 138 in step 914. The air can be drawn into the activated-carbon air filter 146 by an inline duct fan 150 positioned above the HPS lamps 142 and dual arc hybrid lamps 144 within the columnar housing 140. The activated-carbon air filter 146 can comprise a filter cavity comprising activated carbon. The filter cavity can be in fluid communication with a housing space within the columnar housing 140. The HPS lamps 142 and the dual arc hybrid lamps 144 can be contained within the housing space of the columnar housing 140. The inline duct fan 150 can draw in air through the activated-carbon air filter 146 into the filter cavity, then up through the housing space 502, and then be expelled by air ducts to an environment outside the indoor grow environment. This can ventilate the indoor grow environment and remove heat generated by the lamps.

In other embodiments, the method 900 disclosed herein can also be part of a method for cultivating a root column (such as the root column 800 shown in FIG. 8). As previously discussed, the root column can be harvested by separating the plurality of detachable column segments 300 and removing the root column from the column lumen 104. The root column can be a *Cannabis sativa* root column, *Cannabis indica* root column, or a root column of hybrids thereof.

The method 900 can comprise additional steps not shown in FIG. 9. For example, the method 900 can further comprise steps or operations described in the preceding portions of this disclosure.

A number of embodiments have been described. Nevertheless, it will be understood by one of ordinary skill in the art that various changes and modifications can be made to this disclosure without departing from the spirit and scope of the embodiments. Elements of systems, devices, apparatus, and methods shown with any embodiment are exemplary for the specific embodiment and can be used in combination or otherwise on other embodiments within this disclosure. For example, the steps of any methods depicted in the figures or described in this disclosure do not require the particular order or sequential order shown or described to achieve the desired results. In addition, other steps operations may be provided, or steps or operations may be eliminated or omitted from the described methods or processes to achieve the desired results. Moreover, any components or parts of any apparatus or systems described in this disclosure or depicted in the figures may be removed, eliminated, or omitted to achieve the desired results. In addition, certain components or parts of the systems, devices, or apparatus shown or described herein have been omitted for the sake of succinctness and clarity.

Accordingly, other embodiments are within the scope of the following claims and the specification and/or drawings may be regarded in an illustrative rather than a restrictive sense.

Each of the individual variations or embodiments described and illustrated herein has discrete components and features which may be readily separated from or combined with the features of any of the other variations or embodiments. Modifications may be made to adapt a particular situation, material, composition of matter, process, process act(s) or step(s) to the objective(s), spirit or scope of the present invention.

Furthermore, where a range of values is provided, every intervening value between the upper and lower limit of that range and any other stated or intervening value in that stated range is encompassed within the invention. Also, any optional feature of the inventive variations described may be set forth and claimed independently, or in combination with any one or more of the features described herein.

All existing subject matter mentioned herein (e.g., publications, patents, patent applications and hardware) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise, all technical and scientific terms used herein have the same meaning as commonly understood by one of ordinary skill in the art to which this invention belongs.

We claim:

1. A high-density soil-less cultivation system, comprising:
    one or more grow columns, wherein each of the grow columns comprises a column lumen;
    one or more angled housings coupled to the one or more grow columns, wherein each of the angled housings comprises a housing lumen in fluid communication with the column lumen, and wherein each of the angled housings is configured to accommodate plant matter, wherein the column lumen and the housing lumen are configured to accommodate root growth of the plant matter into such lumens;
    a nutrient reservoir configured to contain a nutrient solution to be delivered to the grow columns, wherein the nutrient reservoir is in fluid communication with the grow columns, wherein the nutrient solution comprises a diluted plant food concentrate or liquid fertilizer;
    a liquid cooling unit in fluid communication with the nutrient reservoir and configured to continuously circulate the nutrient solution through the liquid cooling unit to cool the nutrient solution before the nutrient solution is delivered to the grow columns;
    a capture conduit coupled to the grow columns, wherein the capture conduit comprises a capture lumen in fluid communication with the column lumen and wherein the capture conduit is configured to capture and recapture nutrient solution flowing through the grow columns;
    a capture reservoir configured to collect captured or recaptured nutrient solution from the capture conduit, wherein the captured or recaptured nutrient solution is collected to be delivered to the nutrient reservoir for reuse, wherein the capture reservoir comprises a pump configured to pump the captured or recaptured nutrient solution from the captured reservoir to the nutrient reservoir, and wherein a volume of the capture reservoir is smaller than a volume of the nutrient reservoir to ensure a smaller amount of the captured or recaptured nutrient solution is introduced to a larger amount of the nutrient solution within the nutrient reservoir in order to reduce strain on the liquid cooling unit;
    a fluid delivery pipe connecting the nutrient reservoir to the grow columns, wherein at least a segment of the fluid delivery pipe is positioned above the column lumens of the grow columns;
    a spray sprinkler coupled to the segment of the fluid delivery pipe positioned above the column lumens, wherein the spray sprinkler is configured to spray the nutrient solution flowing through the fluid delivery pipe through one or more spray sprinkler openings into one of the column lumens, wherein the one or more spray sprinkler openings are positioned above the column lumen to spray the nutrient solution into the column lumen and wherein the spray sprinkler is positioned vertically above the highest angled housing;
    a carbon dioxide generator positioned vertically above the column lumens, wherein the carbon dioxide generator applies carbon dioxide which is blown down to the plant matter within the angled housings; and
    an omnidirectional light tower configured to shine light on the one or more angled housings to induce growth of the plant matter within the angled housings,
        wherein the omnidirectional light tower comprises:
        a columnar housing;
        seven high-intensity discharge lamps comprising four high-pressure sodium lamps and three dual arc hybrid lamps, wherein the high-pressure sodium lamps are stacked in an alternating manner with the dual arc hybrid lamps such that at least one high-pressure sodium lamp is positioned above and below each of the dual arc hybrid lamps within the columnar housing and
        an activated-carbon air filter serving as a base of the omnidirectional light tower, wherein the activated-carbon air filter has a cylindrical filter housing comprising a filter cavity comprising activated carbon, wherein an outer surface of the cylindrical filter housing is covered by a cloth filter or a mesh filter, wherein the filter cavity is in fluid communication with a housing space within the columnar housing, wherein the high-intensity discharge lamps are contained within the housing space; and
        an inline duct fan positioned above the high-intensity discharge lamps, wherein the inline duct fan is in fluid communication with the housing space, and wherein the inline duct fan is configured to draw in air through the one or more filters of the activated-carbon air filter into the filter cavity and up through the housing space containing the seven high-intensity discharge lamps to be expelled outside.

2. The system of claim 1, wherein the liquid cooling unit is configured to cool the nutrient solution to between about 65 degrees and about 68 degrees Fahrenheit.

3. The system of claim 1, wherein the capture reservoir comprises a reservoir inlet, wherein the reservoir inlet is covered by a submersible filter configured to capture and filter out particulates from the captured or recaptured nutrient solution.

4. The system of claim 1, wherein the spray sprinkler is configured to spray the nutrient solution into one of the column lumens periodically such that spray periods are followed by dry periods where no nutrient solution is delivered into the column lumens.

5. The system of claim 1, wherein each of the grow columns comprises a plurality of detachable column segments connected by column couplers, wherein at least one angled housing is coupled to one of the plurality of detachable column segments.

6. The system of claim 1, wherein at least one of the angled housings comprises a basket comprising one or more perforations along at least one of a bottom and side of the basket, wherein the basket is positioned within at least part of the housing lumen, and wherein the basket is configured to hold the plant matter and accommodate root growth further into the housing lumen.

7. The system of claim 1, wherein at least one of the angled housings comprises a light-blocking collar positioned to fit tightly within at least one of the angled housings and configured to block or obstruct light from entering the housing lumen, wherein the light-blocking collar comprises a port configured to allow at least part of a plant to extend through the port.

8. The system of claim 1, wherein at least one of the angled housings comprises a porous reticulated foam support made of interconnected or interlocking struts or strands configured to block light and serve as a protective barrier against contaminants from entering the angled housing, wherein at least part of the reticulated foam support extends out past the angled housing, wherein the porous reticulated foam support occupies at least part of the housing lumen and is defined by a cavity or channel configured to accommodate the plant matter.

9. The system of claim 1, wherein a plurality of grow columns surround the omnidirectional light tower on at least two opposing sides and wherein the angled housings coupled to the plurality of grow columns extend in a direction of the omnidirectional light tower such that leaves of plant matter contained within the angled housings are exposed to light emitted by the omnidirectional light tower.

* * * * *